(12) United States Patent
Bains

(10) Patent No.: US 7,774,684 B2
(45) Date of Patent: Aug. 10, 2010

(54) RELIABILITY, AVAILABILITY, AND SERVICEABILITY IN A MEMORY DEVICE

(75) Inventor: Kuljit S. Bains, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1076 days.

(21) Appl. No.: 11/479,067

(22) Filed: Jun. 30, 2006

(65) Prior Publication Data
US 2008/0005646 A1 Jan. 3, 2008

(51) Int. Cl.
*G11C 29/00* (2006.01)
*G06F 11/10* (2006.01)

(52) U.S. Cl. .................................. 714/766; 714/807

(58) Field of Classification Search .............. 714/766, 714/807
See application file for complete search history.

(56) References Cited

U.S. PATENT DOCUMENTS

| | | | |
|---|---|---|---|
| 5,134,616 A | | 7/1992 | Barth, Jr. et al. |
| 5,172,339 A | * | 12/1992 | Noguchi et al. ............. 365/201 |
| 6,038,693 A | * | 3/2000 | Zhang ........................ 714/768 |
| 6,233,717 B1 | * | 5/2001 | Choi ......................... 714/805 |
| 6,957,377 B2 | | 10/2005 | Furukawa |
| 6,982,900 B2 | * | 1/2006 | Hirabayashi ................ 365/154 |
| 7,043,579 B2 | * | 5/2006 | Dhong et al. ............... 710/107 |
| 7,043,679 B1 | * | 5/2006 | Keltcher et al. ............. 714/763 |
| 7,117,420 B1 | * | 10/2006 | Yeung et al. ................ 714/763 |
| 7,221,615 B2 | * | 5/2007 | Wallner et al. ......... 365/230.03 |
| 7,447,948 B2 | * | 11/2008 | Galbi et al. ................. 714/701 |
| 2003/0041299 A1 | | 2/2003 | Kanazawa et al. |
| 2005/0172177 A1 | * | 8/2005 | Oikawa ........................ 714/52 |
| 2006/0053361 A1 | * | 3/2006 | Kim ........................... 714/766 |
| 2006/0120166 A1 | | 6/2006 | Kim et al. |
| 2006/0200727 A1 | * | 9/2006 | Akiyama et al. ............. 714/763 |
| 2007/0226588 A1 | * | 9/2007 | Lee et al. .................... 714/758 |

OTHER PUBLICATIONS

International Search Report dated Dec. 17, 2007.
International Preliminary Report on Patentability for corresponding matter, mailed Jan. 15, 2009.
Pending U.S. Appl. No. 11/364,107, filed Feb. 27, 2006, inventor: Kuljit Bains.
Pending U.S. Appl. No. 11/205,645, filed Aug. 16, 2005, inventor: Rosenbluth, et al.
Acer; DDR Memory Technology, RAID Technology White Ppaer, Aug. 2001, 16 pages.
Darnell et al: Configuring DDR2 Memory o Dell Platforms Based on teh Intel E7520 and E7525 Chip Sets; Dell White Paper, Apr. 2005; pp. 1-10.
Dell: A White Paper on the Benefits of Chipkill-Correct ECC for PC Server Main Memory; IBM Microelectronics Division, Rev. Nov. 19, 1997; pp. 1-23.
Intel 865G, Intel 865P, Intel 865PE Chipset Memory Configuration Guide, White Paper, May 2003, Document No. 253036-001; pp. 1-13.
First Office Action for Chinese Patent Application No. 200710129013.9 mailed Jul. 10, 2009, 12 pgs.

* cited by examiner

*Primary Examiner*—Stephen M Baker
(74) *Attorney, Agent, or Firm*—Blakely, Sokoloff, Taylor & Zafman LLP

(57) ABSTRACT

Embodiments of the invention are generally directed to improving the reliability, availability, and serviceability of a memory device. In some embodiments, a memory device includes a memory core having a first portion to store data bits and a second portion to store error correction code (ECC) bits corresponding to the data bits. The memory device may also include error correction logic on the same die as the memory core. In some embodiments, the error correction logic enables the memory device to compute ECC bits and to compare the stored ECC bits with the computed ECC bits.

17 Claims, 10 Drawing Sheets

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 0 | WD0=1 | | | | | | CRC | CRC | WD0=1 | | | ecc0 | ecc1 | ecc2 | ecc3 | CRC | CRC |
| 1 | 0 | 1 | 2 | 3 | 4 | 5 | CRC | CRC | | | | | | | | CRC | CRC |
| 2 | s0 | 7 | 8 | 9 | 10 | 11 | 12 | 13 | Wme=1 | | | ecc4 | ecc5 | ecc6 | ecc7 | | CRC |
| 3 | s1 | 14 | 15 | 16 | 17 | 18 | 19 | 20 | | | | | | | | | CRC |
| 4 | 71 | 64 | 65 | 66 | 67 | 68 | 69 | 70 | | | | ecc8 | ecc9 | ecc10 | ecc11 | | CRC |
| 5 | WD1=0 | 72 | 73 | 74 | 75 | 76 | 77 | 78 | WD1=1 | | g1 | ecc12 | ecc13 | ecc14 | ecc15 | CRC | CRC |
| | | 79 | 80 | 81 | 82 | 83 | 84 | CRC | | | | | | | | | |

FIG. 5A

| 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|
| WD0=1 | 21 | 22 | 23 | 24 | 25 | 26 | CRC | CRC | WD0=1 | 42 | 43 | 44 | 45 | 46 | 47 | CRC | CRC |
| 27 | 28 | 29 | 30 | 31 | 32 | 33 | 34 | CRC | 48 | 49 | 50 | 51 | 52 | 53 | 54 | 55 | CRC |
| Wme=0 | 35 | 36 | 37 | 38 | 39 | 40 | 41 | CRC | 56 | 57 | 58 | 59 | 60 | 61 | 62 | 63 | CRC |
|  | 85 | 86 | 87 | 88 | 89 | 90 | 91 | CRC | 106 | 107 | 108 | 109 | 110 | 111 | 112 | 113 | CRC |
| 92 | 93 | 94 | 95 | 96 | 97 | 98 | 99 | CRC | 114 | 115 | 116 | 117 | 118 | 119 | 120 | 121 | CRC |
| WD1=1 | 100 | 101 | 102 | 103 | 104 | 105 | CRC | CRC | WD1=1 | 122 | 123 | 124 | 125 | 126 | 127 | CRC | CRC |

{ 506 — columns 18–26 }   { 508 — columns 27–35 }

| 0 | 1 | 2 | 3 | 4 | 5 | 6 | 7 |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |

804

| 8 | 9 | 10 | 11 | 12 | 13 | 14 | 15 | 16 | 17 |
|---|---|---|---|---|---|---|---|---|---|
| CRC_A | 32 | 33 | 34 | 35 | 36 | 37 | 38 | 39 | CRC_A |
| CRC_A | 40 | 41 | 42 | 43 | 44 | 45 | 46 | 47 | CRC_A |
| CRC_A | 48 | 49 | 50 | 51 | 52 | 53 | 54 | 55 | CRC_A |
| CRC_A | 56 | 57 | 58 | 59 | 60 | 61 | 62 | 63 | CRC_A |

806

| 0 | 1 | 2 | 3 | 4 | 5 | 6 | 7 |
|---|---|---|---|---|---|---|---|
| 64 | 65 | 66 | 67 | 68 | 69 | 70 | 71 |
| 72 | 73 | 74 | 75 | 76 | 77 | 78 | 79 |
| 80 | 81 | 82 | 83 | 84 | 85 | 86 | 87 |
| 88 | 89 | 90 | 91 | 92 | 93 | 94 | 95 |

808

| 8 | 9 | 10 | 11 | 12 | 13 | 14 | 15 | 16 | 17 |
|---|---|---|---|---|---|---|---|---|---|
| CRC_B | 96 | 97 | 98 | 99 | 100 | 101 | 102 | 103 | CRC_B |
| CRC_B | 104 | 105 | 106 | 107 | 108 | 109 | 110 | 111 | CRC_B |
| CRC_B | 112 | 113 | 114 | 115 | 116 | 117 | 118 | 119 | CRC_B |
| CRC_B | 120 | 121 | 122 | 123 | 124 | 125 | 126 | 127 | CRC_B |

| 0 |
|---|
| 1 |
| 2 |
| 3 |
| 4 |
| 5 |
| 6 |
| 7 |

FIG. 8

RELIABILITY, AVAILABILITY, AND SERVICEABILITY IN A MEMORY DEVICE

TECHNICAL FIELD

Embodiments of the invention generally relate to the field of integrated circuits and, more particularly, to systems, methods and apparatuses for improving reliability, availability, and serviceability in a memory device.

BACKGROUND

Memory devices are susceptible to errors such as transient (or soft) errors. If these errors are not handled properly, they can cause a computing system to malfunction. Redundant information in the form of error correcting codes (ECCs) can be used to improve overall system reliability. The redundant information, however, increases the storage requirement of the memory system and, thereby, increases the cost of the memory system. Thus, ECC is typically only used on high-end or mission critical systems. Lower cost (or less critical) systems do not use ECC and provide a level of reliability which is appropriate to their usage.

In some cases, the extra bits of storage are added to the system by adding additional memory devices (e.g., dynamic random access memory (DRAM) devices). For example, a system using eight DRAMs to store data may also use an additional DRAM to store the check codes. In other cases, the extra bits are stored in a variant DRAM designed especially for use in ECC systems. For example, a non-ECC DRAM may have 256 Mbits of capacity and 16 outputs. The ECC variant of that DRAM may have 288 Mbits of capacity and 18 outputs. In both of these examples, the ECC systems have 12.5% more storage capacity than the non-ECC counterparts.

The use of different DRAM devices in ECC systems has a number of disadvantages. For example, there is an increase in costs associated with designing, manufacturing, and inventorying, two (or more) variants of a DRAM device. In addition, an ECC variant DRAM device is larger than its non-ECC counterpart and, therefore, more difficult to manufacture. Adding the extra bits to the ECC variant DRAM lowers the yield of devices and, thus, increases the cost of the devices. Another disadvantage of using two (or more) variants of a DRAM device is that memory controllers that interface with the DRAM devices are required to support additional pins (e.g., ECC pins). Also, an ECC variant DRAM module uses more space on a motherboard because its connector is larger than its non-ECC counterpart.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 5A and 5B illustrate selected aspects of a sequence of write data frames, according to an embodiment of the invention.

FIG. 8 illustrates selected aspects of a sequence of read data frames, according to an embodiment of the invention.

DETAILED DESCRIPTION

Embodiments of the invention are generally directed to improving the reliability, availability, and serviceability (RAS) of a memory device. In some embodiments, a memory device includes at least one split bank pair that has a first memory bank and a second memory bank. In the error check mode, data bits may be stored in one of the memory banks and the corresponding error check bits are stored in the other memory bank. The memory device may be configured to support either mode using a register bit (e.g., a mode register set (MRS) register bit). The memory device may also include error correction logic. As is further described, the error correction logic may enable the use of cyclic redundancy code (CRC) bits with read return data by integrating ECC generation logic and comparison logic onto the memory device.

Figure 1:
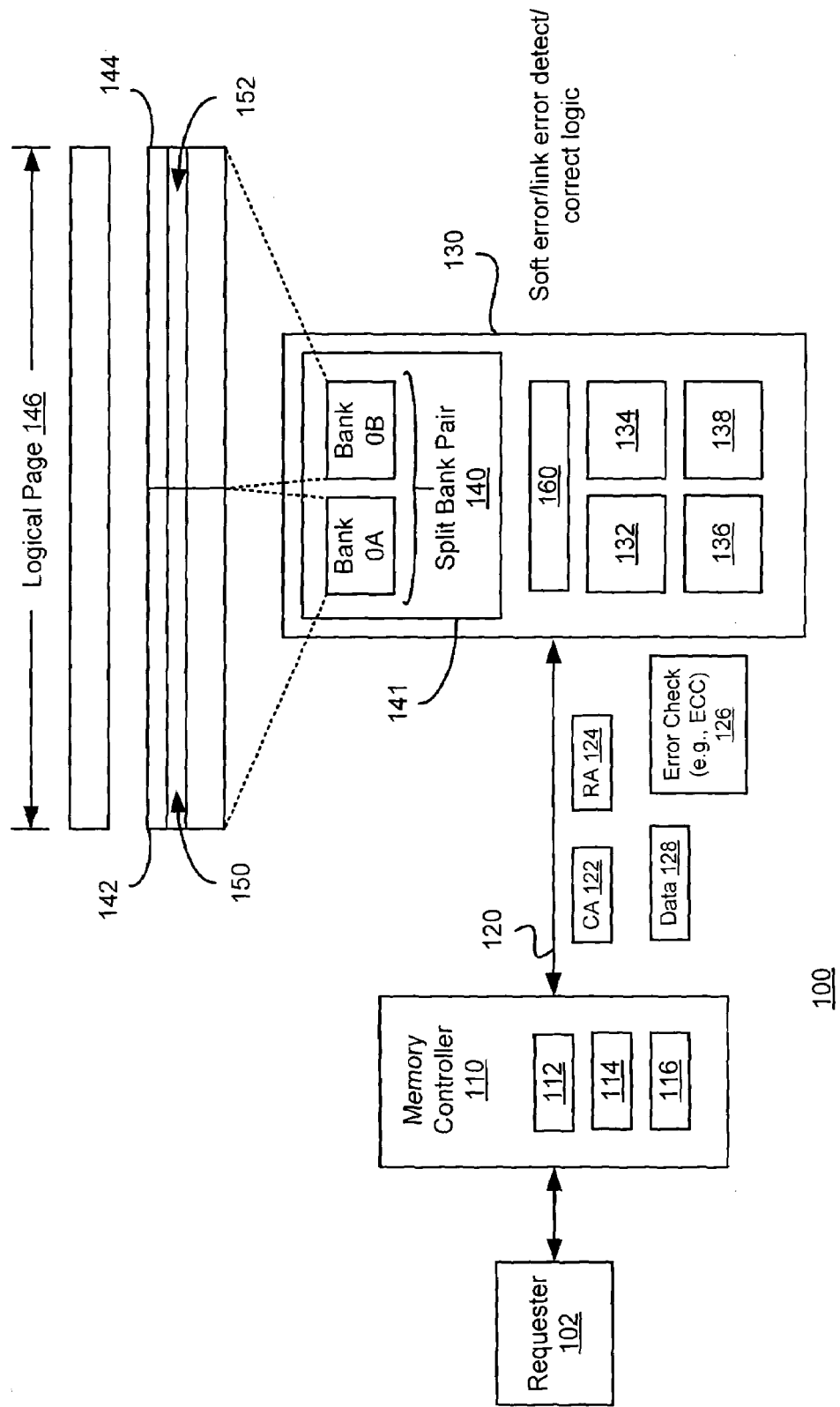
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. Computing system 100 includes requester 102, memory controller (or host) 110, memory device 130, and interconnect 120. Memory controller 110 controls, at least in part, the transfer of information between requester 102 and memory device 130. Requester 102 may be a processor (e.g., a central processing unit and/or a core), a service processor, an input/output device (e.g., a peripheral component interconnect (PCI) Express device), memory itself, or any other element of system 100 that requests access to memory. In some embodiments, memory controller 110 is on the same die as requester 102.

In the illustrated embodiment, memory controller 110 includes error check logic 112, mode indicator 114, and memory device addressing logic 116. Error check logic 112 uses redundant information to protect data from specified faults. In some embodiments, error check logic 112 is an error correction code (ECC).

As is further discussed below, in some embodiments, memory device 130 can operate in either an error check mode or a non-error check mode. When operating in an error check mode, memory device 130 stores both data bits and corresponding error check bits (e.g., ECC bits). When operating in a non-error check mode, (substantially) the entire capacity of memory device 130 is used to store data bits. Mode indicator 114 provides an indication of whether memory device 130 is operating in an error check mode or a non-error check mode. In some embodiments, mode indicator 114 includes one or more register bits.

In some embodiments, memory device 130 applies a different address mapping for read/write data depending on whether it is in the error check mode or the non-error check mode. For example, the address mapping used in the error check mode may account for the mapping of error check bits (e.g., ECC bits). Address mapping logic 116 enables memory controller 110 to be aware of the address mapping used by memory device 130. Address mapping logic 116 may be any logic capable of providing an indication of address mapping for a number of memory locations.

Memory device 130 may be any of a wide range of devices including a dynamic random access memory device (or, simply, a DRAM). Memory core 141 may be organized into one or more split bank pairs 140. A split bank pair refers to a pair of memory banks that can be configured as either a single bank or as two separate banks. In some embodiments, each bank of the split bank pair has its own row decoder and column decoder.

In some embodiments, each bank of the split bank pair can provide a page of memory. For example, bank 0A provides page 142 and bank 0B provides page 144. A "bank" refers to an array of memory locations provided by a memory device. Collectively, banks 142 and 144 can provide logical page 146. The term "logical page" refers to a logical combination of two or more physical banks. In some embodiments, pages 142 and 144 each provide 1 kilobytes (K bytes) of memory and logical page 146 provides a net effective page size of 2K bytes.

In the illustrated embodiment, memory device 130 includes mode indicator 132, posted write buffer 134, partial write mask 136, and column address generation logic 138. Mode indicator 132 provides an indication of whether memory device 130 is operating in an error check mode or a non-error check mode. In some embodiments, mode indicator 132 includes one or more bits of a register such as a mode register set (MRS). Poster write buffer 134 is a buffer to which data is posted prior to being written to the memory core of memory device 130. Partial write mask 136 provides a write mask for data that is written to the memory core. In some embodiments, partial write mask 136 is used to access error check bits associated with data stored in memory device 130. In some embodiments, column address generation logic 138 generates column address information for error check bits associated with data stored in memory device 130.

Memory device 130 may also include on-die error correction logic 160. In some embodiments, error correction logic 160 enhances the reliability, availability, and serviceability (RAS) of memory device 130 when it is operating in the error check mode. More particularly, in some embodiments, error correction logic 160 enables memory device 130 to use CRC bits with read return data even when it is operating in the error check mode. In some embodiments, error correction logic 160 includes ECC computation logic and comparison logic. This computation and comparison logic enables the device to locally compute ECC bits for read data and to compare the locally computed ECC bits with stored ECC bits. If the locally computed ECC bits match the stored ECC bits, then the CRC bits may take the place of the ECC bits in the read return data. The ECC correction logic is further discussed below with reference to FIGS. 6-8.

Figure 2:
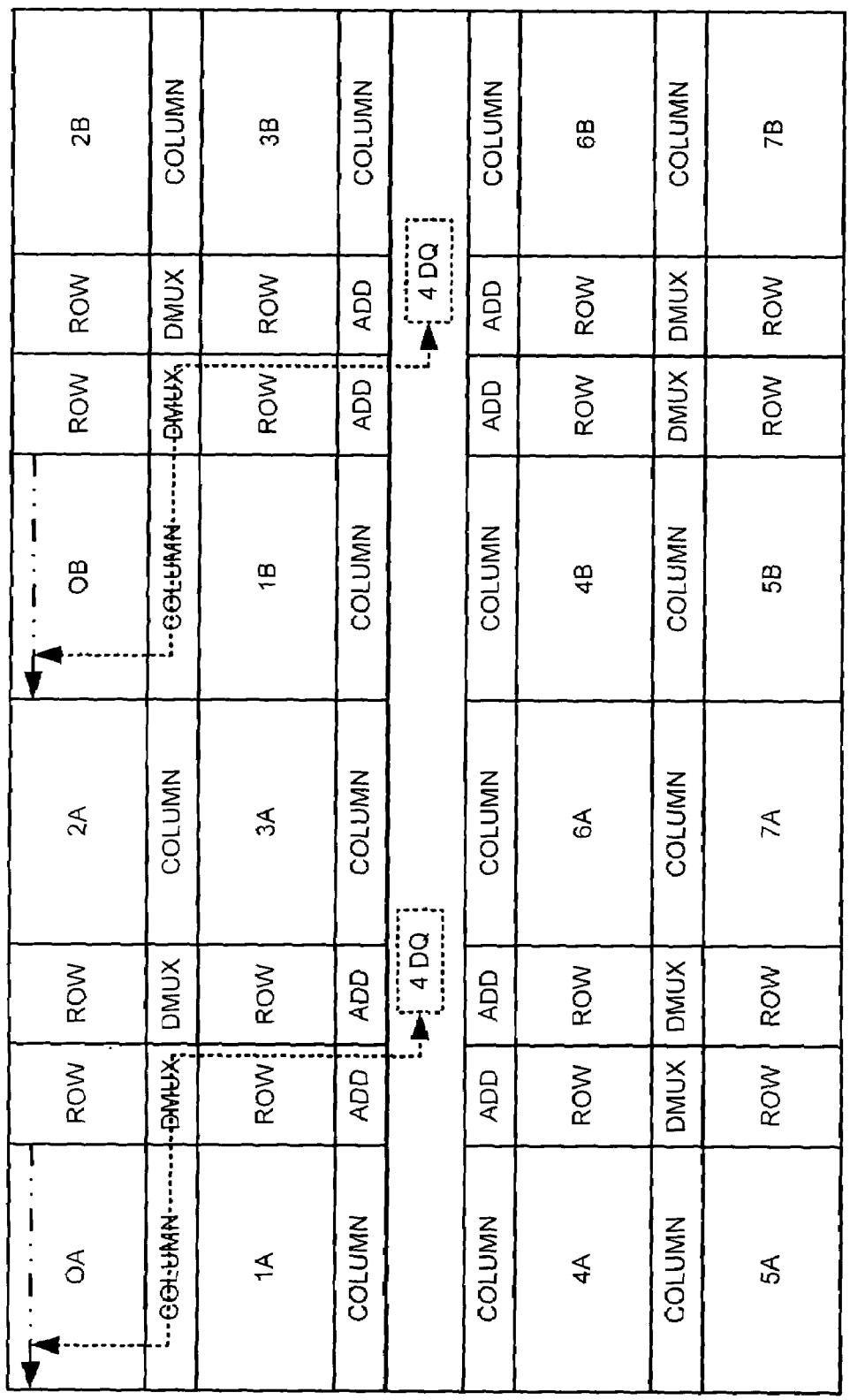
FIG. 2 is a block diagram illustrating selected aspects of a dynamic random access memory (DRAM) implemented according to an embodiment of the invention.

FIG. 2 is a block diagram illustrating selected aspects of a dynamic random access memory (DRAM) implemented according to an embodiment of the invention. DRAM 200 includes 16 memory banks (0A through 7B) or 8 split bank pairs (e.g., split bank pair 0A, 0B). In some embodiments, DRAM 200 can be configured as either a x4 or a x8 DRAM. In x4 mode, DRAM 200 provides 16 banks (0A through 7B) and each bank provides 64 bits of data to 4 data (DQ) pins. In x8 mode, DRAM 200 provides 8 split bank pairs to provide 128 bits of data to 8 DQ pins.

In some embodiments, DRAM 200 can be configured to operate in either an error check mode (e.g., an ECC mode) or a non-error check mode. When operating in an error check mode, DRAM 200 leverages its split bank architecture by storing data in one member of the split bank (e.g., bank 0A) and corresponding error check bits (e.g., ECC bits) in the other member of the split bank (e.g., bank 0B). In some embodiments, DRAM 200 is configured as a x8 DRAM when it is operating in the error check mode.

Figure 3:
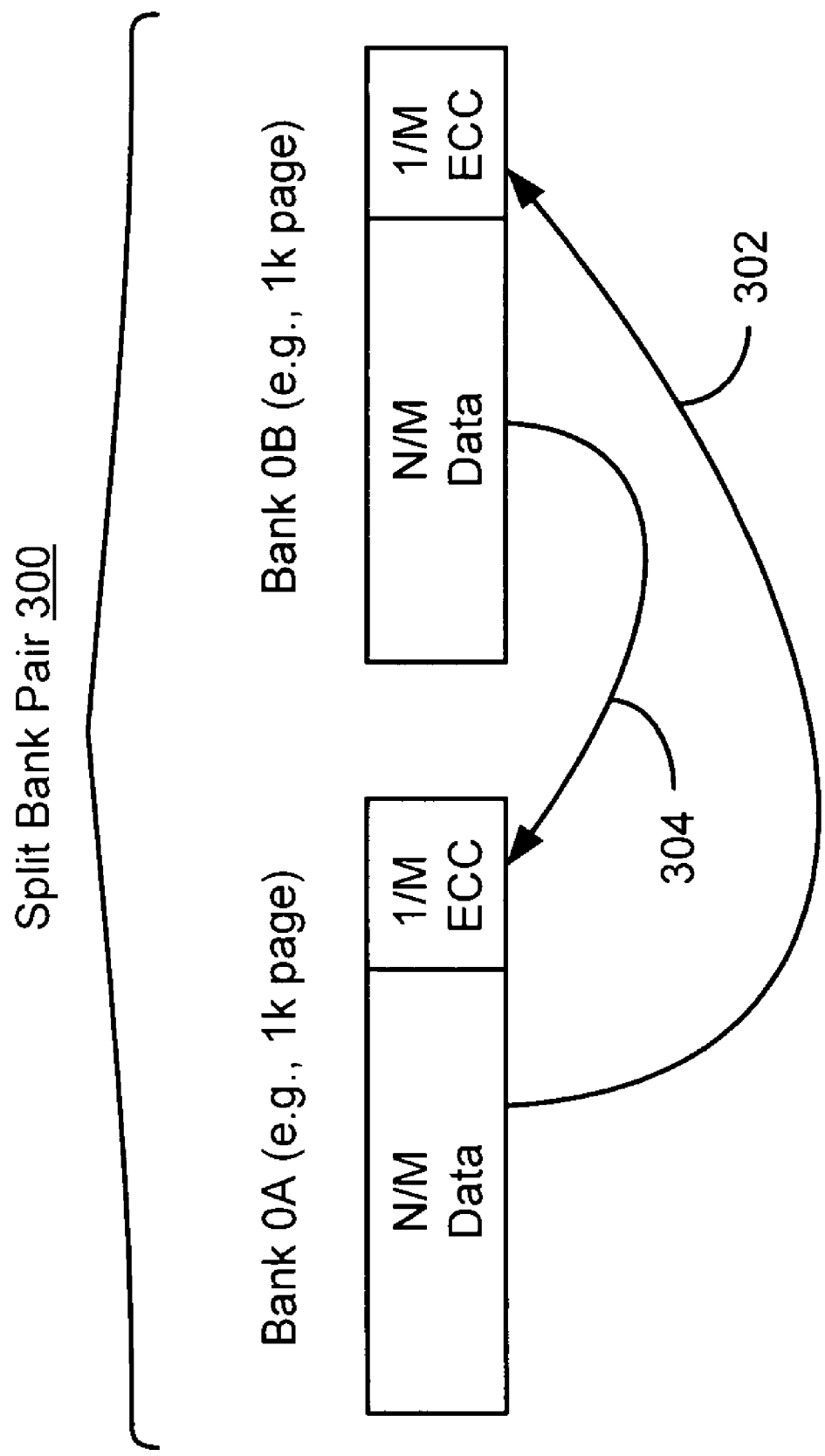
FIG. 3 is a block diagram illustrating selected aspects of a dynamic random access memory (DRAM) implemented according to an embodiment of the invention.

FIG. 3 is a block diagram illustrating selected aspects of storing data bits and error check bits in a split bank pair, according to an embodiment of the invention. Split bank pair 300 includes bank 0A and bank 0B. In some embodiments, data is stored in up to N/Mths (e.g., ⅞ths) of the locations in each bank and corresponding error check bits are stored in the last 1/Mth (e.g., ⅛) of the other member of split bank pair 300. For example, the error check bits covering the data stored in bank 0A may be stored in the top ⅛th of the memory locations of bank 0B (302). Similarly, the error check bits covering the data stored in bank 0B may stored in the top ⅛th of the memory locations of bank 0A (304). In some embodiments, the error check bits are error check code (ECC) bits.

In some embodiments, a host (e.g., memory controller 110, shown in FIG. 1) addresses a specific bank in the split bank pair to identify the bank that is receiving/providing the data bits. If the memory device is in the error check mode, then it uses its internal logic (e.g., partial write mask 136, column address generation logic 138, etc., shown in FIG. 1) to access the error check bits corresponding to the data bits. Accessing data bits and corresponding error check bits is further discussed below with reference to FIGS. 4-8.

Figure 4:
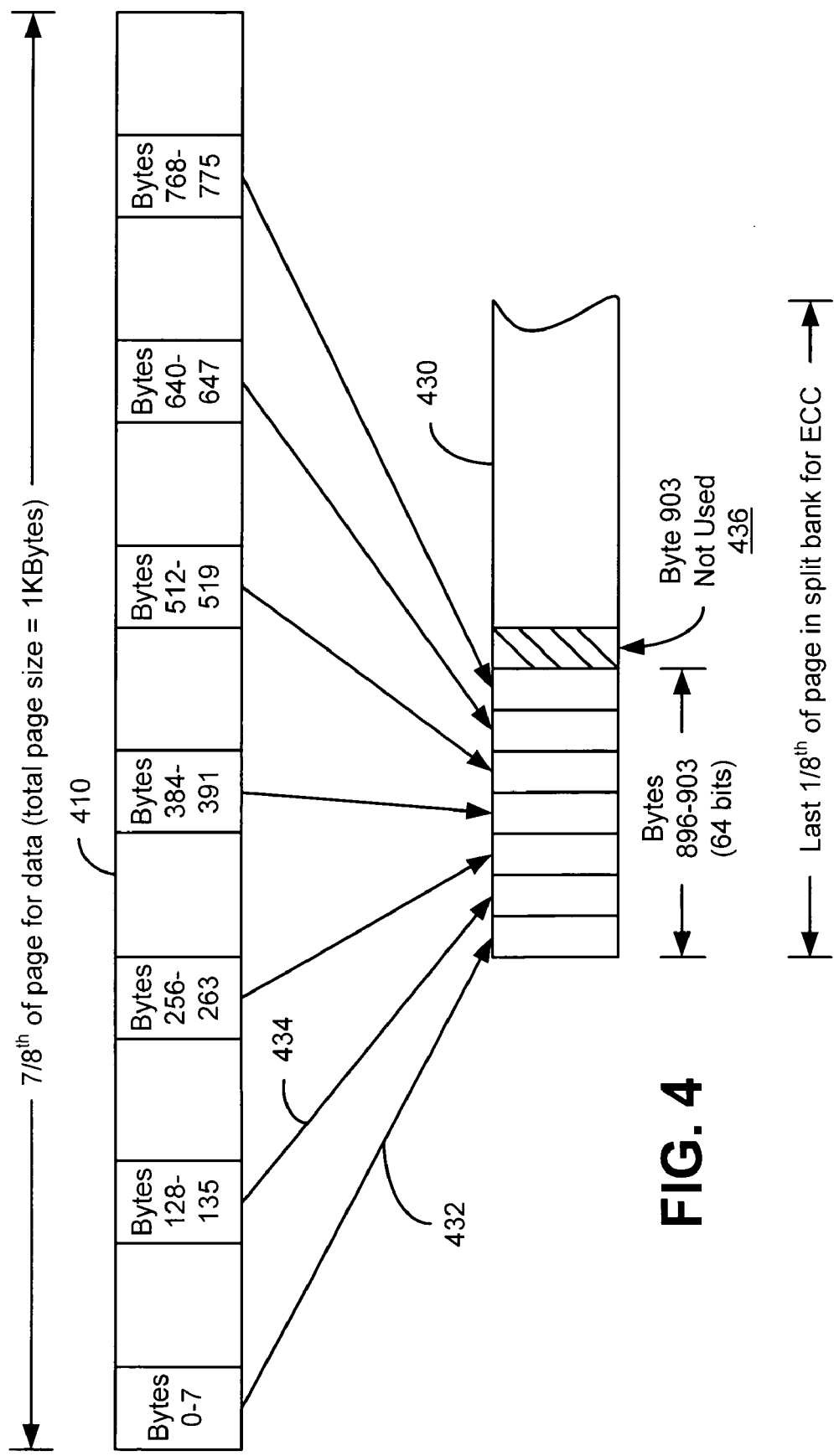
FIG. 4 is a block diagram illustrating an example of the address mapping between data bits and error check bits, according to an embodiment of the invention.

FIG. 4 is a block diagram illustrating an example of the address mapping between data bits and error check bits, according to an embodiment of the invention. In the illustrated embodiment, the data bits are stored in ⅞ths of a page that is provided by a bank within a split pair of banks as shown by 410. The corresponding error check bits are stored in the upper ⅛th of the other bank in the split bank pair (430). For example, the ECC bits covering bytes 0-7 are stored at memory location 896 as shown by reference number 432. Similarly, the ECC bits covering bytes 128-135 are stored at memory location 897 as shown by reference number 434 and this pattern is continued for the data bytes in page 410 as shown in FIG. 4. In some embodiments, the last byte of the upper ⅛th of bank 430 (e.g., location 903) is not used as shown by reference number 436. In some embodiments, the error check bits covering bytes 8-15 are stored in location 905 and the sequence repeats itself.

FIGS. 5A and 5B illustrate selected aspects of a sequence of write data frames, according to an embodiment of the invention. The write sequence illustrated in FIGS. 5A and 5B may be used in a system having a parallel memory channel with two memory devices. Each device sees all four frames and is assigned either D0 to D63 or D64 to D127. The assignment of memory devices is further discussed below.

In some embodiments, a write sequence includes the following frames: write header (Wh) 502, ECC write frame (We) 504, write data 1 (Wd1) 506, and write data 2 (Wd2) 508. In some embodiments, each frame is a six-bit frame (labeled 0 to 5) that is nine bits deep (e.g., unit intervals 0 to 8 or 9 to 17). Wh 502 includes header information for the write sequence as well as some data bits.

We 504 transfers the error check bits (e.g., ECC bits 510, shown in UIs 12-15) that cover the associated data bits. In some embodiments, the error check bits (e.g., ECC bits) are transferred to memory device 130 using partial write mask encoding. That is, We 504 may have the same command encoding as a partial write mask frame (Wm) except that the mask bits are replaced by error check bits (e.g., ECC bits 510, shown in unit intervals 12-15). ECC bits ECC0-ECC7 cover data bits D0-D63 and ECC bits ECC8-ECC15 cover data bits D64-D127. In some embodiments, We frame 504 is required for all write data transfers when the system is operating in the error check mode.

Wd1 506 and Wd2 508 transfer the rest of the data bits for the write operation. Data bits D0-D63 are used by one memory device and D64-D127 are used by another memory device. In some embodiments a register bit within a memory device determines which memory device picks up which data bits. For example, the MRS register may be used to assign data bits to a memory device.

In some embodiments, address bit g1 (512) is provided with We 504 to enable loading of split PWB implementations. In some embodiments, it is optional for a memory device to use g1 in connection with loading the PWBs. Address bit g1 may be provided with the write CASs to indicate that one of the split banks is used for data storage and the other for ECC bit storage.

Figure 6:
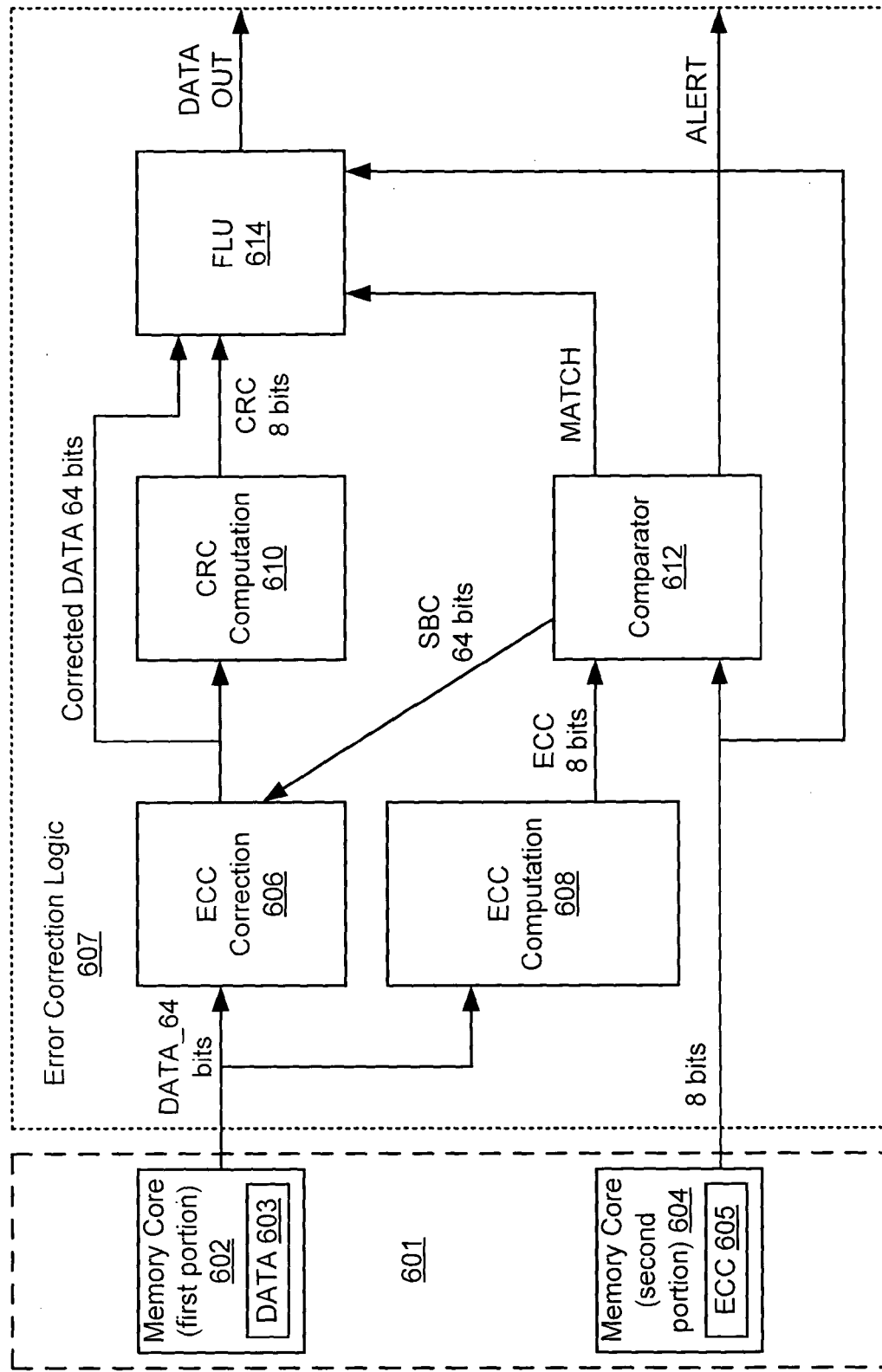
FIG. 6 is a block diagram illustrating selected aspects of on-die error correction logic, according to an embodiment of the invention.

FIG. 6 is a block diagram illustrating selected aspects of on-die error correction logic, according to an embodiment of the invention. In some embodiments, memory device 600 (e.g., a DRAM) includes, inter alia, memory core 601 and error correction logic 607. Memory core 601 and error correction logic 607 may be integrated onto a common chip. In some embodiments, memory core 601 may include multiple portions such as first portion 602 and second portion 604. For example, first portion 602 and second portion 604 may each be a split bank in a split bank pair. Data bits 603 are stored in first portion 602 and corresponding ECC bits 605 are stored in second portion 604. In some embodiments, ECC bits 605 are computed by a host (e.g., memory controller 110, shown in FIG. 1) and provided to memory device 600 in a write data frame (e.g., ECC write frame 504, shown in FIG. 5).

Error correction logic 607 includes logic to improve the RAS of memory device 600. In some embodiments, error correction logic 607 includes logic to check for and correct ECC errors. The portion of the read data frame that would have been used to convey ECC bits may then be used to convey CRC bits. Thus, data bits 603 may be covered for both soft errors and link errors without conveying ECC bits in the read data frame.

In the illustrated embodiment, error correction logic 607 includes ECC correction logic 606, ECC computation logic 608, CRC computation logic 610, comparator 612, and frame logic unit (FLU) 614. In alternative embodiments, error correction logic 607 may include more elements, fewer elements, and/or different elements. In addition, in some embodiments, one or more of the elements illustrated as being part of error correction logic 607 may be implemented in a different part memory device 600.

ECC computation logic 608 computes ECC bits to cover data 603. In some embodiments, logic 608 uses the same polynomial to compute the ECC bits as was used to compute ECC bits 605. For example, logic 608 may use the same polynomial as error check logic 112, shown in FIG. 1. Logic 608 may use almost any error correction code polynomial. In some embodiments, the polynomial may be a combination of an ECC and a CRC. In the illustrated embodiment, logic 608 computes 8 ECC bits to cover 64 data bits. In alternative embodiments, the number of ECC bits and/or data bits may be different.

Comparator 612 compares the computed ECC bits with the stored ECC bits (e.g., ECC bits 605). If the two sets of ECC bits match, then comparator 612 asserts a MATCH signal. If the computed ECC bits do not match the stored ECC bits, then data bits 603 may contain an error. In some embodiments, error correction logic 607 includes ECC correction logic 606 to correct certain errors. In such embodiments, if the two sets of ECC bits do not match, then comparator 612 may provide data (e.g., an indication of which ECC bits failed to match) to ECC correction logic 606 so that it can correct the problem. In some embodiments, logic 606 includes single bit correct logic and SBC denotes the signal bit that needs to be corrected out of, for example, 64 bits. Comparator 612 may assert the ALERT signal if it detects an error having a weight that logic 606 cannot correct. For example, comparator 612 may assert the ALERT signal if it detects a double bit error. Comparator 612 may be any logic suitable for comparing one set of bits to another and asserting one or more signals in response to the comparison.

As discussed above, ECC correction logic 606 includes logic to correct certain kinds of errors (e.g., single bit errors). In some embodiments, logic 606 receives data bits 603 and the SBC data as inputs and outputs corrected data. If no error is detected, then data bits 603 may simply flow through ECC correction logic 606.

CRC computation logic 610 computes CRC bits to cover the data bits provided by logic 606 (e.g., either corrected data bits or the original data). In some embodiments, CRC computation logic 610 computes 8 CRC bits to cover 64 data bits. In alternative embodiments, the number of CRC bits and/or the number of data bits may be different. CRC computation logic 610 may include logic to implement any of a wide range of CRC polynomials. In alternative embodiments, a different scheme may be used to generate the link error protection bits. For example, in some embodiments logic 610 may implement a parity scheme or any other scheme to provide link error protection.

Frame logic unit (FLU) 614 includes logic to frame the data bits and/or the CRC bits for transmission to a requester. In some embodiments, FLU 614 appends the CRC bits to the data bits. In alternative embodiments, FLU 614 frames the CRC bits separately from the data bits. In some alternative embodiments, FLU 614 may transmit the failed ECC bits if, for example, a double bit error is detected.

Figure 7:
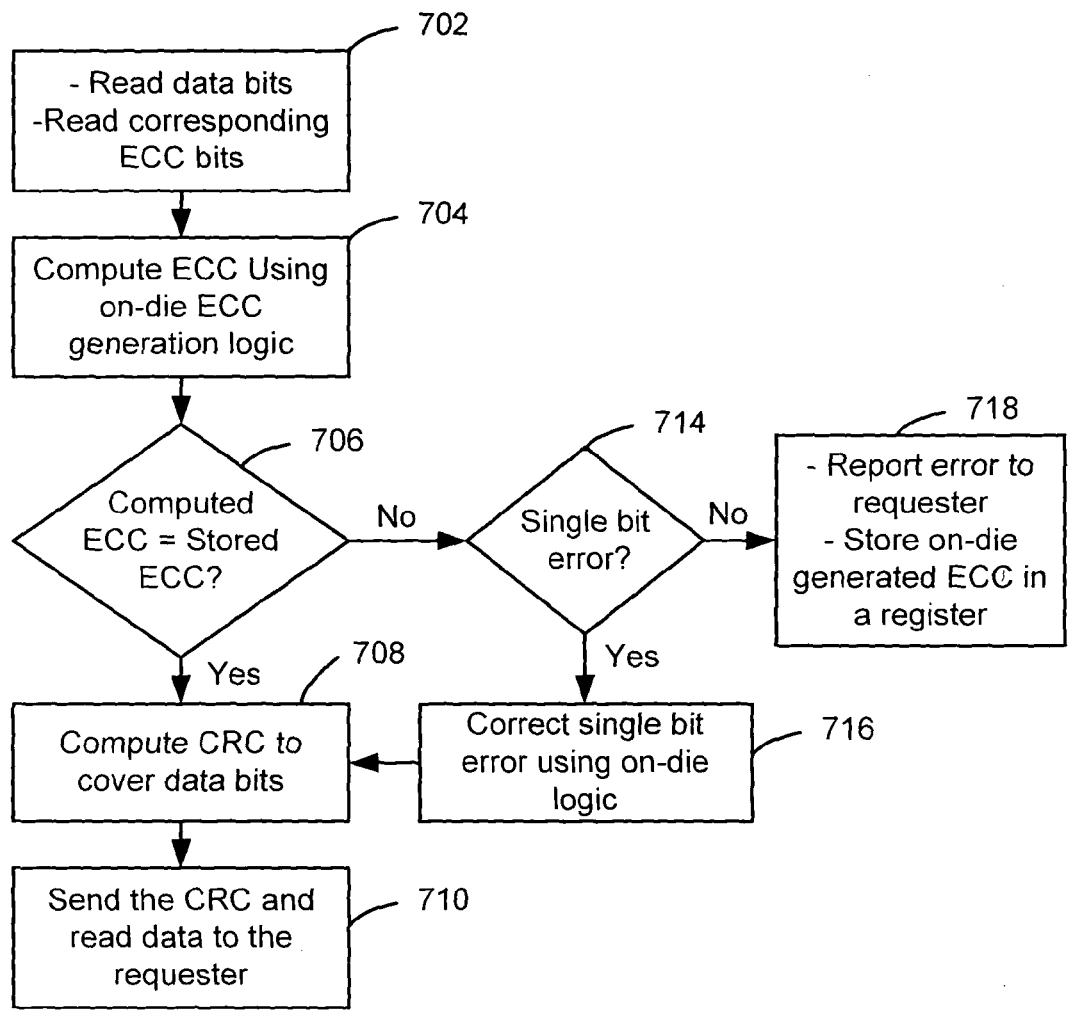
FIG. 7 is a flow diagram illustrating selected aspects of reading data from a memory device, according to an embodiment of the invention.

FIG. 7 is a flow diagram illustrating selected aspects of reading data from a memory device according to an embodiment of the invention. Referring to process block 702, on-die error correction logic reads data bits and corresponding ECC bits from respective portions of a memory core (e.g., memory core 601, shown in FIG. 6). For ease of discussion, the term "stored ECC bits" refers to ECC bits that are generated before the data bits are written to a memory device and that are stored on the memory device with the data bits that they cover. The term "computed ECC bits," in contrast, refers to ECC bits that are computed by ECC computation logic that is on the same die as the memory core.

Referring to process block 704, on-die ECC computation logic (e.g., logic 608, shown in FIG. 6) computes ECC bits for the data bits using the same polynomial that was used to compute the stored ECC bits. The computed ECC bits are compared with the stored ECC bits at 706. If the computed ECC bits match the stored ECC bits, then on-die CRC computation logic computes a CRC to cover the bits as shown by 708. Referring to process block 710, the CRC bits and the data bits are sent to a requester (using, e.g., FLU 614, shown in FIG. 6).

If the computed ECC bits do not match the stored ECC bits, then the on-die error correction logic determines whether the detected error has a weight that can be corrected by on-die ECC correction logic. For example, process block 714 shows the error correction logic checking for a single bit error. If the data bits contain a single bit error, then it may be corrected at 716. CRC bits may then be computed (708) and the CRC bits and corrected data bits may be sent to a requester (710). In some embodiments, the corrected data may be written back to the memory core and/or logged as an error in a register location that the host can later scrub.

If the detected error has a weight that indicates it cannot be corrected, then the error correction logic reports an error using, for example, an ALERT signal (718). In some embodiments, the failing ECC bits are stored in, for example, a register location. In some embodiments, the error correction logic sends the ECC bits (e.g., instead of the CRC bits) to the requester if either a single bit error or a double bit error is detected. In such embodiments, an ALERT signal may also be asserted. The host may then decide how to process the corrupted data.

FIG. 8 illustrates selected aspects of read data frames, according to an embodiment of the invention. If the system (e.g., system 100, shown in FIG. 1) is in the error check mode, then, in some embodiments, 64 bits of data are transferred over two back-to-back frames. For example, frames 802 and 804 convey 64 data bits in unit intervals (UIs) 0-7 and 9-16. In addition, frames 802 and 804 convey eight CRC bits. For example, four CRC bits in UI 8 and four more CRC bits in UI 17.

In some embodiments, two reads are performed in parallel and 128 data bits are transferred in four frames. For example, in the illustrated embodiment, frames 802 and 804 transfer the first 64 data bits (e.g., d0-d63) and frames 806 and 808 transfer another 64 data bits (e.g., d64-d127). The CRC bits covering data bits d0-d63 (e.g., CRC_A) are, respectively, transferred in UIs 8 and 17 of frames 802 and 804. Similarly, the CRC bits covering data bits d64-d127 (e.g., CRC_B) are, respectively, transferred in UIs 8 and 17 of frames 806 and 808. In alternative embodiments, the read frames may have a different structure and/or a different number of frames may be conveyed. The RAS of the memory device is improved because the data bits have coverage for both soft errors and link errors but only the CRC bits are returned with the read data frames.

Figure 9:
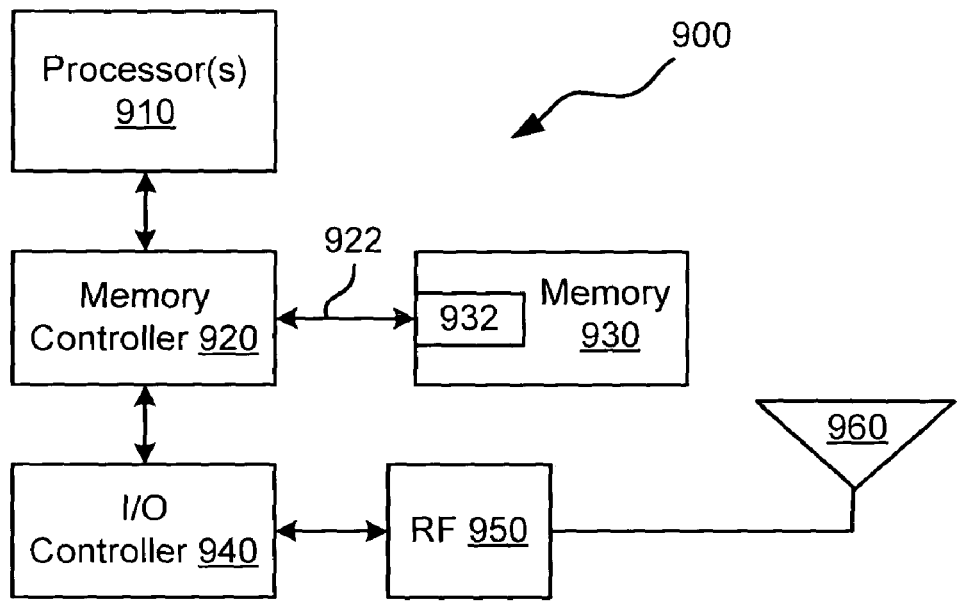
FIG. 9 is a block diagram illustrating selected aspects of an electronic system according to an embodiment of the invention.

FIG. 9 is a block diagram illustrating selected aspects of an electronic system according to an embodiment of the invention. Electronic system 900 includes processor 910, memory controller 920, memory 930, input/output (I/O) controller 940, radio frequency (RF) circuits 950, and antenna 960. In operation, system 900 sends and receives signals using antenna 960, and these signals are processed by the various elements shown in FIG. 9. Antenna 960 may be a directional antenna or an omni-directional antenna. As used herein, the term omni-directional antenna refers to any antenna having a substantially uniform pattern in at least one plane. For example, in some embodiments, antenna 960 may be an omni-directional antenna such as a dipole antenna or a quarter wave antenna. Also, for example, in some embodiments, antenna 960 may be a directional antenna such as a parabolic dish antenna, a patch antenna, or a Yagi antenna. In some embodiments, antenna 960 may include multiple physical antennas.

Radio frequency circuit 950 communicates with antenna 960 and I/O controller 940. In some embodiments, RF circuit 950 includes a physical interface (PHY) corresponding to a communication protocol. For example, RF circuit 950 may include modulators, demodulators, mixers, frequency synthesizers, low noise amplifiers, power amplifiers, and the like. In some embodiments, RF circuit 950 may include a heterodyne receiver, and in other embodiments, RF circuit 950 may include a direct conversion receiver. For example, in embodiments with multiple antennas 960, each antenna may be coupled to a corresponding receiver. In operation, RF circuit 950 receives communications signals from antenna 960 and provides analog or digital signals to I/O controller 940. Further, I/O controller 940 may provide signals to RF circuit 950, which operates on the signals and then transmits them to antenna 960.

Processor(s) 910 may be any type of processing device. For example, processor 910 may be a microprocessor, a microcontroller, or the like. Further, processor 910 may include any number of processing cores or may include any number of separate processors.

Memory controller 920 provides a communication path between processor 910 and other elements shown in FIG. 9. In some embodiments, memory controller 920 is part of a hub device that provides other functions as well. As shown in FIG. 9, memory controller 920 is coupled to processor(s) 910, I/O controller 940, and memory 930.

Memory 930 may include multiple memory devices. These memory devices may be based on any type of memory technology. For example, memory 930 may be random access memory (RAM), dynamic random access memory (DRAM), static random access memory (SRAM), nonvolatile memory such as FLASH memory, or nay other type of memory. Memory 930 may support an error check mode and a non-error check mode. In some embodiments, memory 930 includes on-die error correction logic 932. Error correction logic 932 may enable the use of cyclic redundancy code (CRC) bits with read return data by integrating ECC generation logic and comparison logic onto the memory device.

Memory 930 may represent a single memory device or a number of memory devices on one or more modules. Memory controller 920 provides data through interconnect 922 to memory 930 and receives data from memory 930 in response to read requests. Commands and/or addresses may be provided to memory 930 through interconnect 922 or through a different interconnect (not shown). Memory controller 920 may receive data to be stored in memory 930 from processor 910 or from another source. Memory controller 920 may provide the data it receives from memory 930 to processor 910 or to another destination. Interconnect 922 may be a bi-directional interconnect or a unidirectional interconnect. Interconnect 922 may include a number of parallel conductors. The signals may be differential or single ended. In some embodiments, interconnect 922 operates using a forwarded, multiphase clock scheme.

Memory controller 920 is also coupled to I/O controller 940 and provides a communications path between processor(s) 910 and I/O controller 940. I/O controller 940 includes circuitry for communicating with I/O circuits such as serial ports, parallel ports, universal serial bus (USB) ports and the like. As shown in FIG. 9, I/O controller 940 provides a communication path to RF circuits 950.

Figure 10:
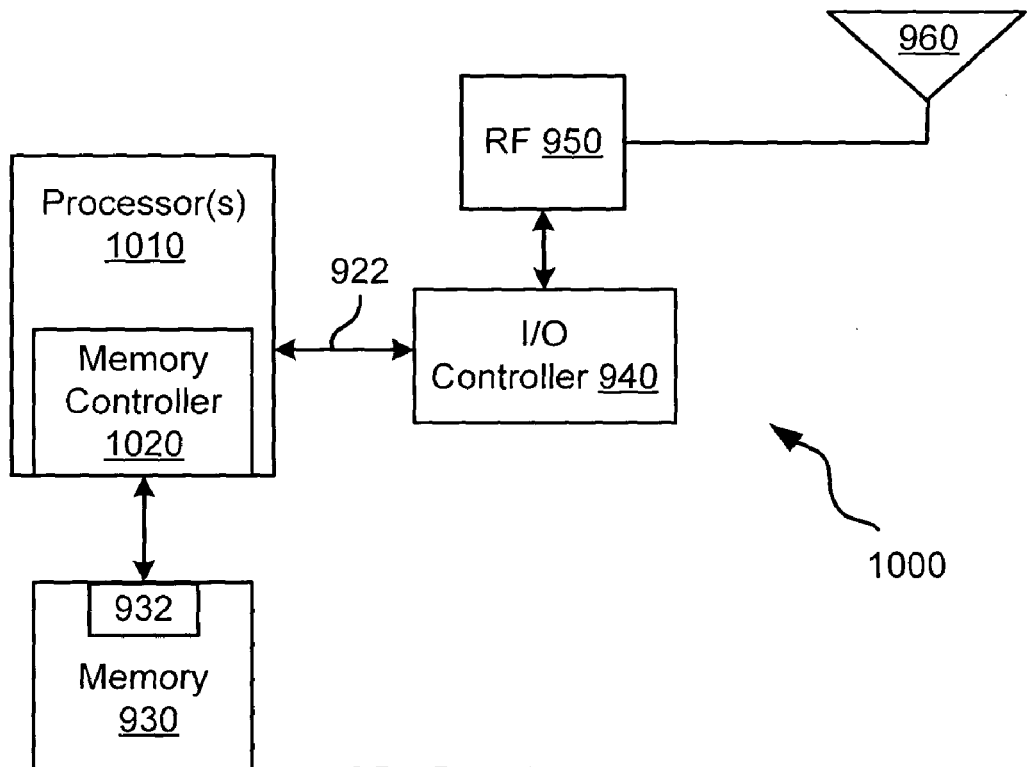
FIG. 10 is a bock diagram illustrating selected aspects of an electronic system according to an alternative embodiment of the invention.

FIG. 10 is a bock diagram illustrating selected aspects of an electronic system according to an alternative embodiment of the invention. Electronic system 1000 includes memory 930, I/O controller 940, RF circuits 950, and antenna 960, all of which are described above with reference to FIG. 9. Electronic system 1000 also includes processor(s) 1010 and memory controller 1020. As shown in FIG. 10, memory controller 1020 may be on the same die as processor(s) 1010. Processor(s) 1010 may be any type of processor as described above with reference to processor 910 (FIG. 5). Example systems represented by FIGS. 9 and 10 include desktop computers, laptop computers, servers, cellular phones, personal digital assistants, digital home systems, and the like.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. A memory device comprising:
  a memory core having a first portion to store data bits and a second portion to store error correction code (ECC) bits (stored ECC bits) corresponding to the data bits; and
  error correction logic on the same die as the memory core, the error correction logic including ECC computation logic to compute ECC bits (computed ECC bits) corresponding to the data bits, wherein the error correction logic further comprises ECC correction logic to correct an error in the data bits, a comparator to compare the stored ECC bits with the computed ECC bits, cyclic redundancy code (CRC) generation logic to generate CRC bits corresponding to the data bits and framing logic to send the CRC bits and the data bits to a requester.

2. The memory device of claim 1, wherein the memory core includes a split bank pair of memory banks having a first memory bank corresponding to the first portion and a second memory bank corresponding to the second portion.

3. The memory device of claim 1, wherein the memory device comprises a dynamic random access memory (DRAM) device.

4. The memory device of claim 1, wherein the memory device is capable of operating in an error check mode and a non-error check mode.

5. The memory device of claim 4, wherein the memory device further comprises:
  mapping logic to map the stored ECC bits to the second portion of the memory core.

6. A method comprising:
  reading data bits from a first portion of a memory core;
  reading stored error correction code (ECC) bits from a second portion of the memory core;
  generating computed ECC bits using ECC computation logic, wherein the memory core and the ECC computation logic are on a common integrated circuit;
  comparing the stored ECC bits with the computed ECC bits to determine whether the stored ECC bits match the computed ECC bits; and
  sending the CRC bits and the data bits to a requester, subsequent to correcting the single bit error.

7. The method of claim 6, wherein the memory core includes a split bank pair of memory banks having a first memory bank corresponding to the first portion and a second memory bank corresponding to the second portion.

8. The method of claim 6, wherein sending the CRC bits and the data bits to the requester comprises:
  framing the data bits in a read data frame;
  appending the CRC bits to the read data frame; and
  sending the read data frame to the requester.

9. The method of claim 6, further comprising:
  computing cyclic redundancy code (CRC) bits corresponding to the data bits, if the stored ECC bits match the computed ECC bits; and
  sending the CRC bits and the data bits to a requester.

10. The method of claim 9, further comprising:
  determining whether the data bits contain a single bit error, if the stored ECC bits do not match the computed ECC bits; and
  if the data bits contain a single bit error, then correcting the single bit error using ECC correction logic, wherein the ECC correction logic and the memory core are on a common integrated circuit.

11. The method of claim 10, further comprising:
  reporting an error to a requester, if the data bits do not contain a single bit error.

12. A system comprising:
  a dynamic random access memory (DRAM) device including
    a split bank pair of memory banks including a first memory bank and a second memory bank, wherein data bits are to be stored in the first memory bank and corresponding error correction code (ECC) bits (stored ECC bits) are to be stored in the second memory bank, if the DRAM device is in an error check mode, and
    error correction logic on the same die as the split bank pair, the error correction logic including ECC correction logic to correct an error in the data bits, a comparator to compare the stored ECC bits with the computed ECC bits, cyclic redundancy code (CRC) generation logic to generate CRC bits corresponding to the data bits and framing logic to send the CRC bits and the data bits to a requester; and
  the requestor coupled with the DRAM device.

13. The system of claim 12, wherein the error correction logic further comprises:
  cyclic redundancy code (CRC) generation logic to generate CRC bits corresponding to the data bits.

14. The system of claim 12, wherein error correction logic further comprises:

framing logic to send the CRC bits and the data bits to a requester.

15. The system of claim 12, wherein the DRAM device further includes:

mapping logic to map the stored ECC bits to the second memory bank.

16. The system of claim 12, wherein the error correction logic further comprises:

ECC correction logic to correct an error in the data bits.

17. The system of claim 16, wherein the error correction logic further comprises:

a comparator to compare the stored ECC bits with the computed ECC bits.

* * * * *